(12) United States Patent
Manur et al.

(10) Patent No.: US 7,903,554 B1
(45) Date of Patent: Mar. 8, 2011

(54) LEAKING COMPONENT LINK TRAFFIC ENGINEERING INFORMATION

(75) Inventors: Rajeev Manur, Sunnyvale, CA (US); Krishnamurthy Subramanian, Mountain View, CA (US); Vishal Zinjuvadia, San Jose, CA (US)

(73) Assignee: Force 10 Networks, Inc., San Jose ( * ) Notice: Subject to any disclaimer, the term of this patent is extended or adjusted under 35 U.S.C. 154(b) by 223 days.

(21) Appl. No.: 12/080,748

(22) Filed: Apr. 4, 2008

(51) Int. Cl.
*H04L 12/28* (2006.01)

(52) U.S. Cl. ............... 370/230.1; 370/254; 370/389

(58) Field of Classification Search .......... 370/254–256, 370/389, 230.1, 379
See application file for complete search history.

(56) References Cited

U.S. PATENT DOCUMENTS

| | | | | |
|---|---|---|---|---|
| 2004/0114595 A1* | 6/2004 | Doukai | ............... | 370/389 |
| 2006/0146696 A1* | 7/2006 | Li et al. | ............... | 370/218 |
| 2008/0151756 A1* | 6/2008 | Vasseur et al. | ............... | 370/237 |
| 2008/0151783 A1* | 6/2008 | Bamba | ............... | 370/254 |
| 2008/0253281 A1* | 10/2008 | Li et al. | ............... | 370/218 |
| 2008/0253379 A1* | 10/2008 | Sasagawa | ............... | 370/395.5 |
| 2008/0310442 A1* | 12/2008 | Li | ............... | 370/419 |
| 2009/0182894 A1* | 7/2009 | Vasseur et al. | ............... | 709/239 |

* cited by examiner

*Primary Examiner* — Ayaz R Sheikh
*Assistant Examiner* — Mounir Moutaouakil
(74) *Attorney, Agent, or Firm* — Robert Schuler

(57) ABSTRACT

Traffic engineering using a label-switching protocol is enhanced for label-switched paths that traverse a logical link that is an aggregation of component links. In one embodiment, a label edge router is provided with information regarding the bandwidth capabilities and loading of the component links of a LAG. The label edge router is then allowed to set up paths that traverse a specific component link of a LAG, and reserve bandwidth on such a component link. Other traffic may continue to be distributed across the LAG membership.

16 Claims, 14 Drawing Sheets

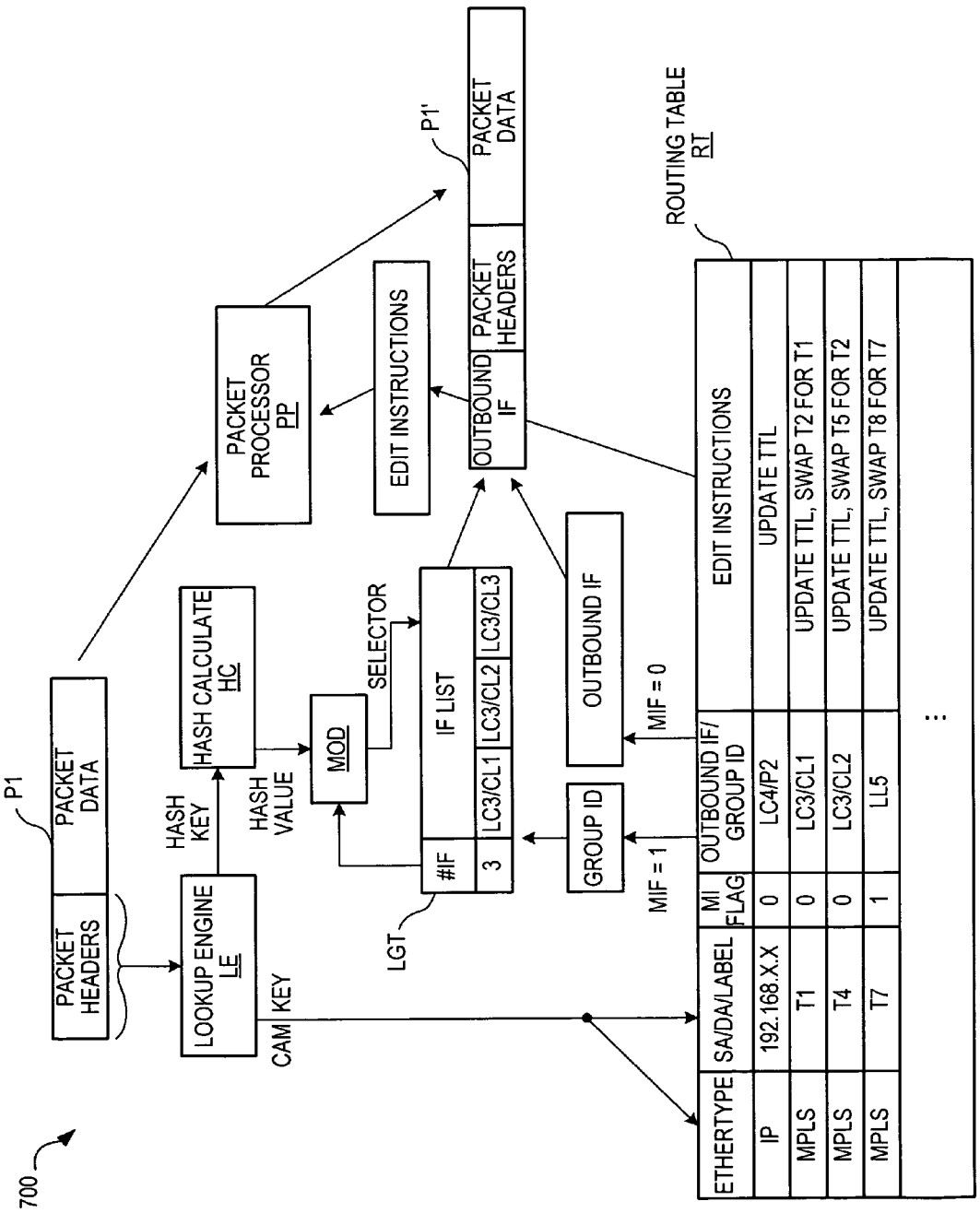

LEAKING COMPONENT LINK TRAFFIC ENGINEERING INFORMATION

BACKGROUND

1. Field of the Invention

The present disclosure relates generally to packet networks, and more particularly to the operation of traffic-engineered label-switched paths within such networks.

2. Description of Related Art

In a packet network, "nodes" or "routers" share network address information that allows each node or router to forward packets toward their respective destination networks. For networks defined using the Internet Protocol, each node is provisioned with a network address that identifies the particular network the system is on, and with a system or host address that uniquely identifies the node. These addresses are shared among neighboring nodes to allow each router to build a "tree" with itself as the root node and next-hop paths from itself to every address on the network.

Routers use IP network and host addresses to forward routed traffic internally on a packet network according to an internal routing (or gateway) protocol (an "IGP"). Some common internal gateway protocols in use today include Open Shortest Path First (OSPF) and Intermediate System to Intermediate System (IS-IS). OSPF is further described in Internet Engineering Task Force (IETF) Request for Comments (RFC) 2328, "OSPF Version 2," by J. Moy, April 1998, and IETF RFC 2740, "OSPF for IPv6," R. Coltun, December 1999. IS-IS is further described in the International Organization for Standardization (ISO) document ISO 8473, "Intermediate System to Intermediate System Routing Information Exchange Protocol for Providing the Connectionless-mode Network Service," ISO/IEC 10589:2002, $2^{nd}$ Ed.

OSPF and IS-IS are examples of link-state protocols. A "link" can be considered to be an interface or port on a router, or an aggregation of such interfaces or ports that are treated as a single link by the routing protocol (FIG. 1A shows a logical link LL5 that is an aggregation of three physical links). The state of each link contains a description of the interface and what routers/networks are reachable through that link. In OSPF, a link-state database would contain the IP address of the interface/device, the subnet mask and other information describing the network, a list of routers connected to that network, a cost of sending packets across that interface, etc.

OSPF routers use link-state advertisements (LSAs) to share information from their link-state databases with neighboring routers in the same autonomous system. Whenever an interface is brought up or a change in routing information known to the router occurs, the router generates a LSA to inform its neighbors of the new or changed link-state information. When a neighbor router receives the LSA, it updates its own link-state database and then propagates the information in another LSA to its neighbors. Thus the LSA is flooded to all routers, and all routers contain the same link-state database.

Whenever a router receives an update to its link-state database, it uses a shortest path algorithm (the Dijkstra algorithm) to calculate a shortest path tree to all destinations, based on the accumulated costs associated with the links used to reach each destination. The shortest path tree will differ for each router, as each places itself at the root of the tree, but all routers should agree with each other as to routes. In other words, no routing loops should exist where node A thinks that a destination should be reached through a node B, and node B thinks that the destination should be reached through node A.

In order to place limits on the flooding of LSAs, OSPF allows routers in the same autonomous system to be grouped into areas. For instance, FIG. 1A depicts two areas A0, A1 of an autonomous system (AS) 100. Every AS must have an area 0 or backbone area. Generally, all other areas connect to the backbone area, although provisions exist for transit areas.

Routers are classified according to their position in the AS. An internal router has all of its interfaces in the same area. In area A1, routers LSR1 and LSR2 are internal routers. An area border router (ABR) has interfaces in multiple areas of the AS. LER1 has two interfaces (L2 and L3) in area A1, and at least one interface in another area (L0 in area A0), and is thus an ABR. An autonomous system boundary router (ASBR) has at least one interface in an area of the AS and at least one interface to another AS or running another routing protocol. The ASBR selectively redistributes information received from the foreign network/protocol within OSPF. In FIG. 1A, routers LER1 and LER2 are ASBRs. Both LER1 and LER2 communicate, over link L1 and links L9 and L10, respectively, with routers (not shown) outside of the AS using an external gateway protocol, such as Border Gateway Protocol (BGP).

Although OSPF and IS-IS provide one method to direct traffic across a packet network, other methods exist. For instance, protocols such as Multi-Protocol Label Switching (MPLS) allow packets to be routed across a packet network using small "labels" or "tags" inserted in the packets. Neighboring routers agree beforehand that packets transmitted from an upstream router to a downstream router with a given label will be forwarded along a unidirectional "label-switched path" (LSP) that has been pre-arranged. A LSP is essentially a tunnel set up between two "label edge routers" (LERs), one of which receives the packets and inserts the first label, and the other of which removes the last label and forwards the packet using other means (such as a traditional routing protocol). Other routers along the path are termed "label-switching routers" (LSRs), due to their function of switching incoming labels they recognize for outgoing labels that their downstream neighbor will recognize. Generally, the packets traversing a LSP belong to a common "Forwarding Equivalent Class" (FEC) that can be routed efficiently using the two LERs as points along the routing path.

One use for MPLS LSPs is in the operation of a traffic-engineered network. Using shortest-path routing algorithms, it is difficult to guide specific traffic towards underutilized paths, and thus the "shortest" paths tend to be overutilized, decreasing network performance as a whole. In a traffic-engineered (TE) network, different constraints such as link utilization and which links can guarantee a given bandwidth, latency, etc., enter in to the selection of a path, e.g., using a "constraint-based routing" algorithm. Once an appropriate path is found for a traffic stream, an MPLS traffic-engineered LSP tunnel can be set up to forward that traffic stream.

In order to use constraint-based routing to reach a remote endpoint, an ingress endpoint must know more than just the traditional IGP link state information. As shown in FIG. 1B, the nodes in a TE network flood TE LSAs throughout the network. For instance, LSR1 sends TE LSAs to LER1, LSR2, and LSR3, reporting traffic engineering information on outgoing links L2, L4, and LL5. LSR1 also floods TE LSAs that it receives from LER1, LSR2, and LSR3 to the others in this group. LER1, upon receiving TE LSAs, builds a Traffic Engineering Database (TED) for area A1, from which it can construct MPLS LSPs.

FIG. 2 shows the general format of an OSPF TE LSA 200. TE LSA 200 contains a standard OSPF LSA header, marked as an Opaque TE LSA. Each TE LSA contains two TLVs (Type-Length-Value fields)—a router address TLV (which identifies the router that generated the LSA) and a link TLV. The link TLV contains between two and nine sub-TLVs, of the types shown in FIG. 2. These TLVs describe the link, its traffic engineering attributes, and its bandwidth attributes.

An edge router can examine its link-state database and traffic engineering database and determine a path across a network area that it believes to be a good fit for a traffic class. The edge router can attempt to set up this path by issuing an MPLS-TE path message, using protocol packets such as Resource ReSerVation Protocol (RSVP) packets, including an Explicit Route Object that specifies the path to be taken. FIG. 1C shows an example. LER1 determines that a given traffic class should be traffic engineered on an explicit route LSR1-LSR2-LER2. LER1 generates an RSVP path message to LSR1. Assuming LSR1 can meet the bandwidth request on LL5, LSR1 propagates the RSVP path message to LSR2. When LSR2 can also meet the bandwidth request on L7, LSR2 propagates the RSVP path message to LER2.

When the receiving LER receives an RSVP path message, it generates an RSVP return reservation request and sends it back to the LSR from which it received the RSVP path message. FIG. 1D shows an example. LER2 generates an RSVP return reservation request (RREQ) that identifies the RSVP path message of FIG. 1C, and specifies a label to be applied to packets sent over this LSP to LER2. LER2 sends RREQ to LSR2, which reserves the requested bandwidth on L7. LSR2 generates an RSVP RREQ packet with a label to be applied to packets sent over this LSP to LSR2, and sends RREQ to LSR1. LSR2 creates an entry in its forwarding database, identifying the labels to be swapped for the LSP, and an outgoing interface (link L7) to be used. LSR1 performs similar functions as LSR2.

When LER1 receives RREQ from LSR1, it may now use its LSP by modifying packets of the given FEC with an MPLS header containing the label supplied by LSR1 and forwarding them on L2. FIG. 1E shows an example of the MPLS LSP segments, where LSR1 has instructed LER1 to use an MPLS label T1, LSR2 has instructed LSR1 to use an MPLS label T2, and LER2 has instructed LSR2 to use an MPLS label T3. As shown in FIG. 1F, LER1 receives packets of the requested forwarding equivalence class FEC1, e.g., on link L1. The packets are modified with an MPLS header to traverse the links L2, LL5, and L7, respectively, with labels T1, T2, and T3 inserted respectively by LER1, LSR1, and LSR2. LER2 removes the MPLS header and forwards the packets FEC1 out an appropriate interface, e.g., L9, using an appropriate IP routing protocol.

MPLS, RSVP, and Traffic Engineering are complex interrelated subjects with voluminous design documents that describe operation in further detail. The following Internet Engineering Task Force (IETF) documents describe various features useful in understanding the framework underlying the embodiments in additional detail, and are incorporated herein by reference: IETF Request For Comments (RFC) 2205, S. Berson et al., "Resource ReSerVation Protocol (RSVP)," September 1997; IETF RFC 2702, D. Awduche et al., "Requirements for Traffic Engineering Over MPLS," September 1999; IETF RFC 3031, E. Rosen et al., "Multi-protocol Label Switching Architecture," January 2001; IETF RFC 3209, D. Awduche et al., "RSVP-TE: Extensions to RSVP for LSP Tunnels," December 2001; IETF RFC 3477, K. Kompella et al., "Signalling Unnumbered Links in Resource ReSerVation Protocol-Traffic Engineering (RSVP-TE), January 2003; IETF RFC 3630, D. Katz et al., "Traffic Engineering (TE) Extensions to OSPF Version 2," September 2003; IETF RFC 3945, E. Mannie, "Generalized Multi-Protocol Label Switching (GMPLS) Architecture," October 2004; IETF RFC 4090, P. Pan et al., "Fast Reroute Extensions to RSVP-TE for LSP Tunnels," May 2005; IETF RFC 4203, K. Kompella et al., "OSPF Extensions in Support of Generalized Multi-Protocol Label Switching (GMPLS)," October 2005; IETF RFC 4220, M. Dubuc et al., "Traffic Engineering Link Management Information Base," November 2005. Other RFCs exist, including those for creating label-switched traffic-engineered paths with IS-IS and MPLS competitor protocols, such as Constraint-Routing Label Distribution Protocol (CR-LDP). The list above provides a representative tabulation of MPLS-TE concepts understood by those skilled in the art.

BRIEF DESCRIPTION OF THE DRAWINGS

FIG. 7 depicts a block diagram showing components used by an LSR embodiment performing hardware-based label-swapping.

DETAILED DESCRIPTION

Figure 1A:
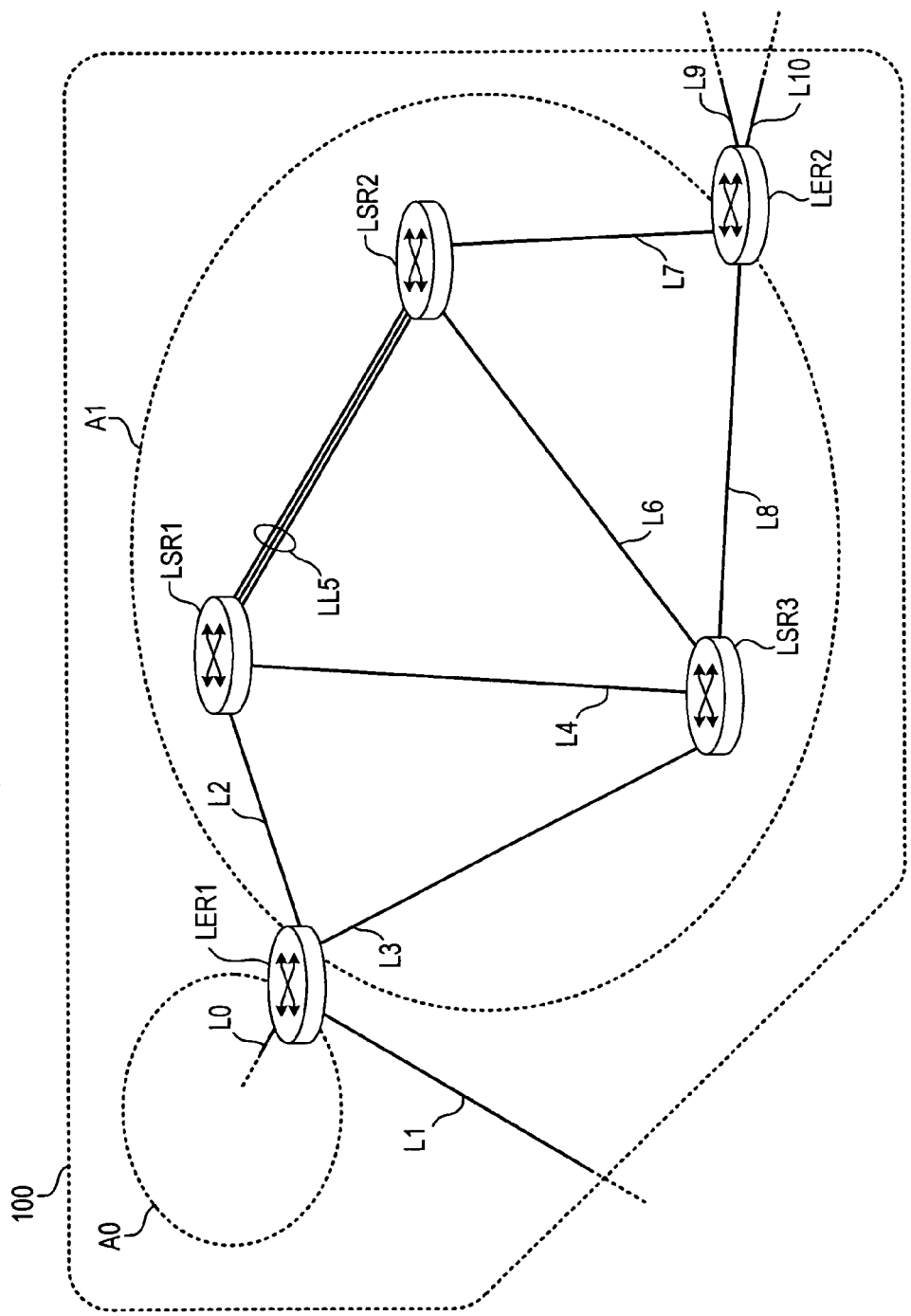
FIGS. 1A-1F show a network area and its use to create a prior art traffic-engineered label-switched path across the network area.
Figure 1B:
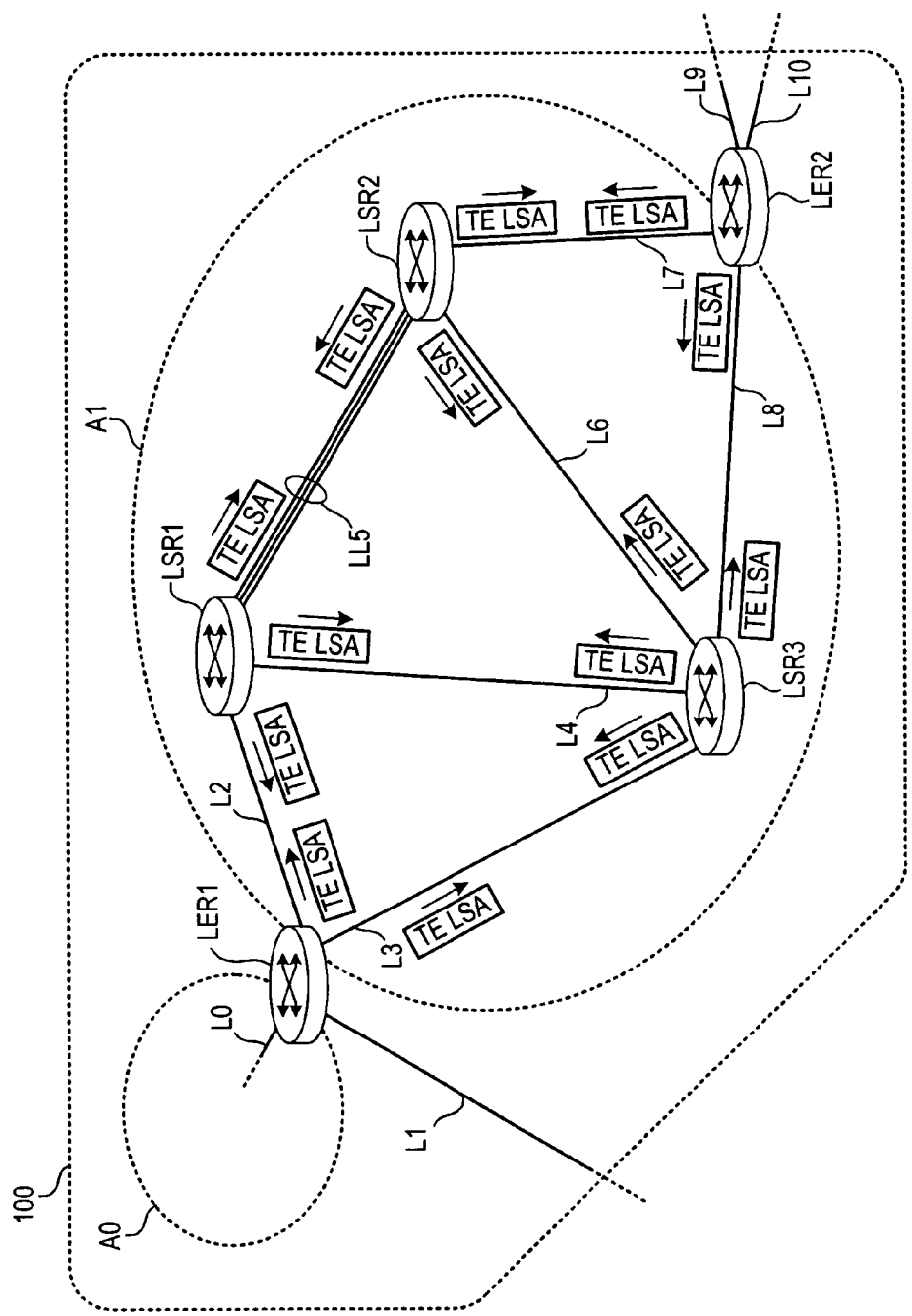
Figure 1C:
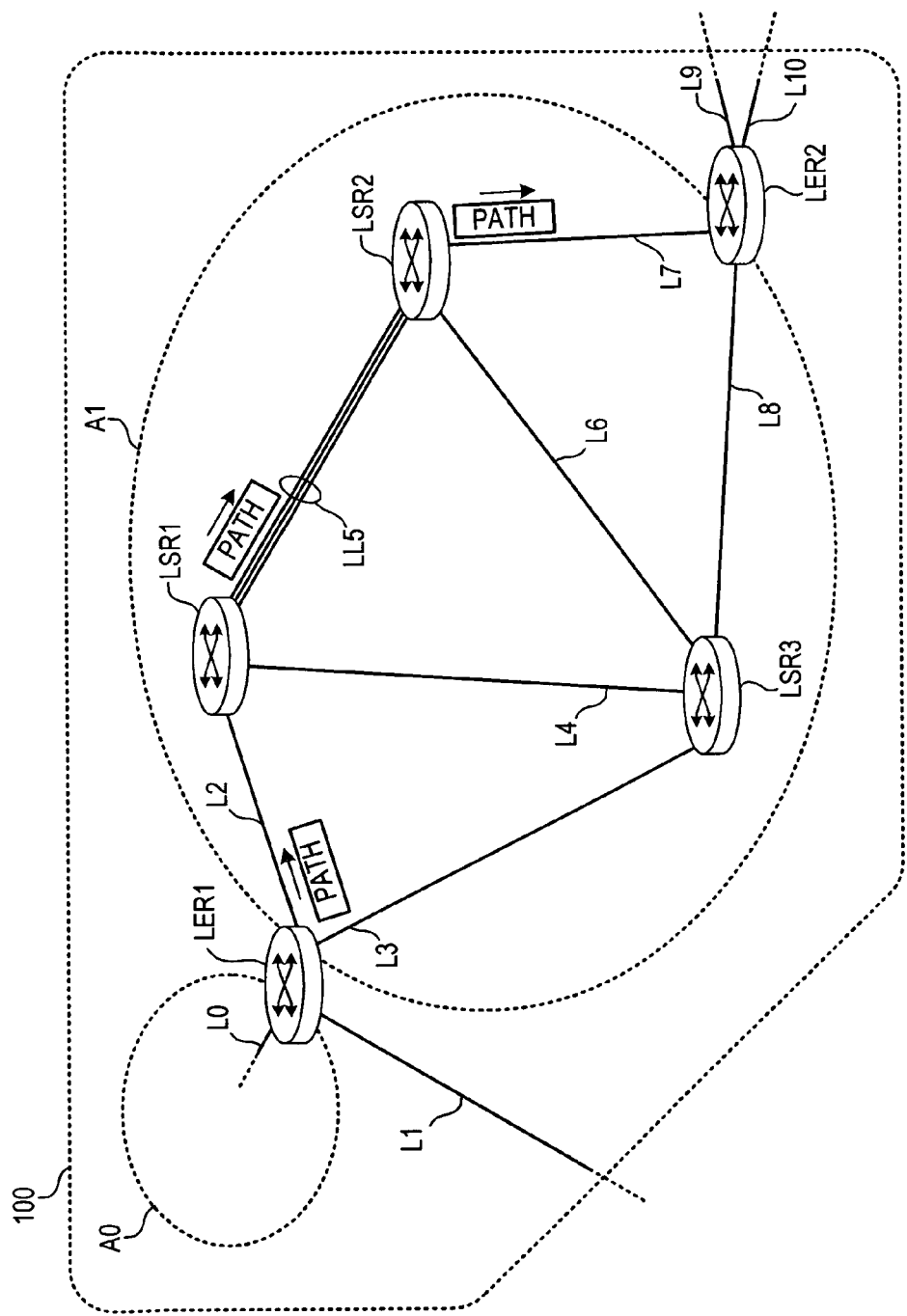
Figure 1D:
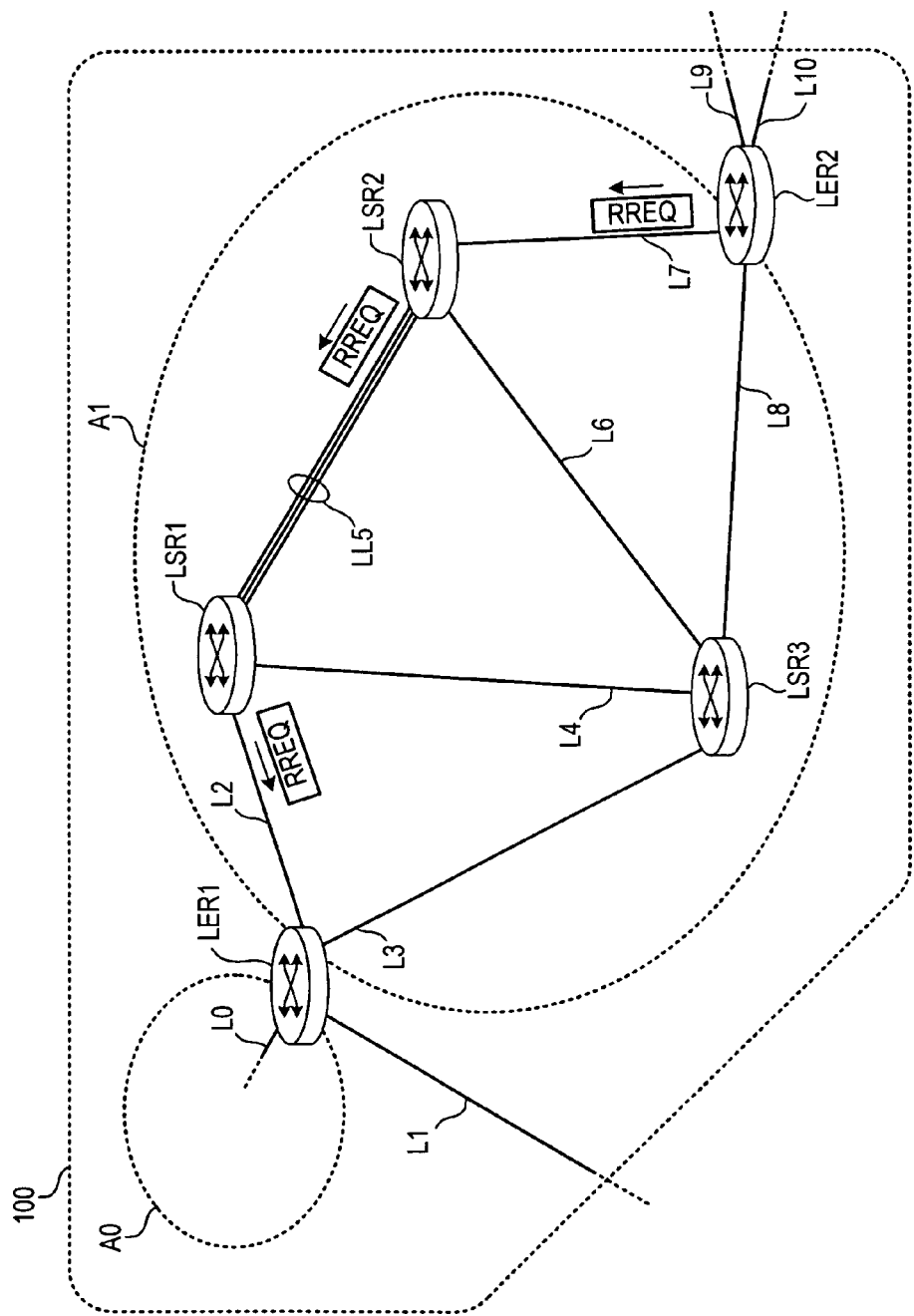
Figure 1E:
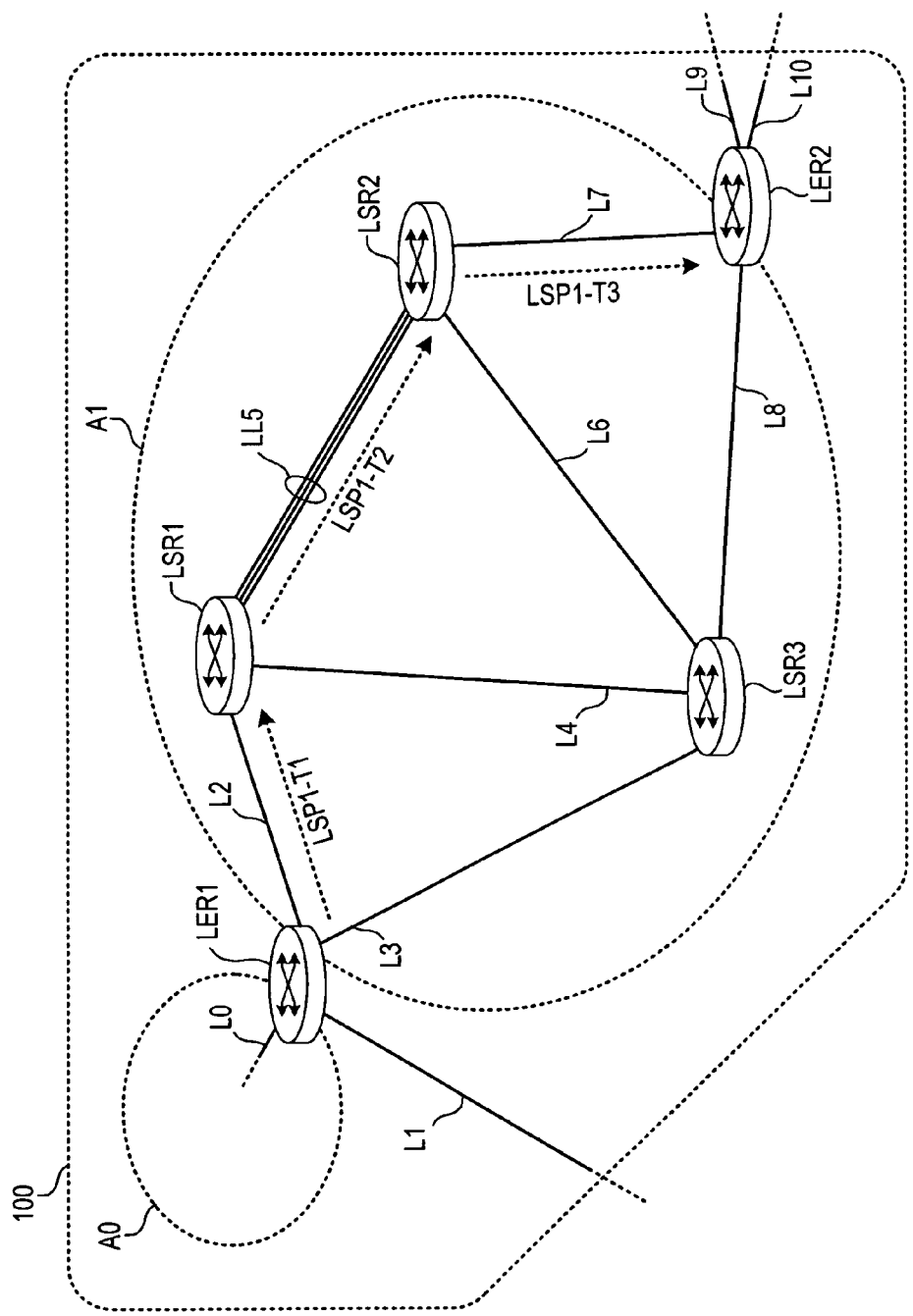
Figure 1F:
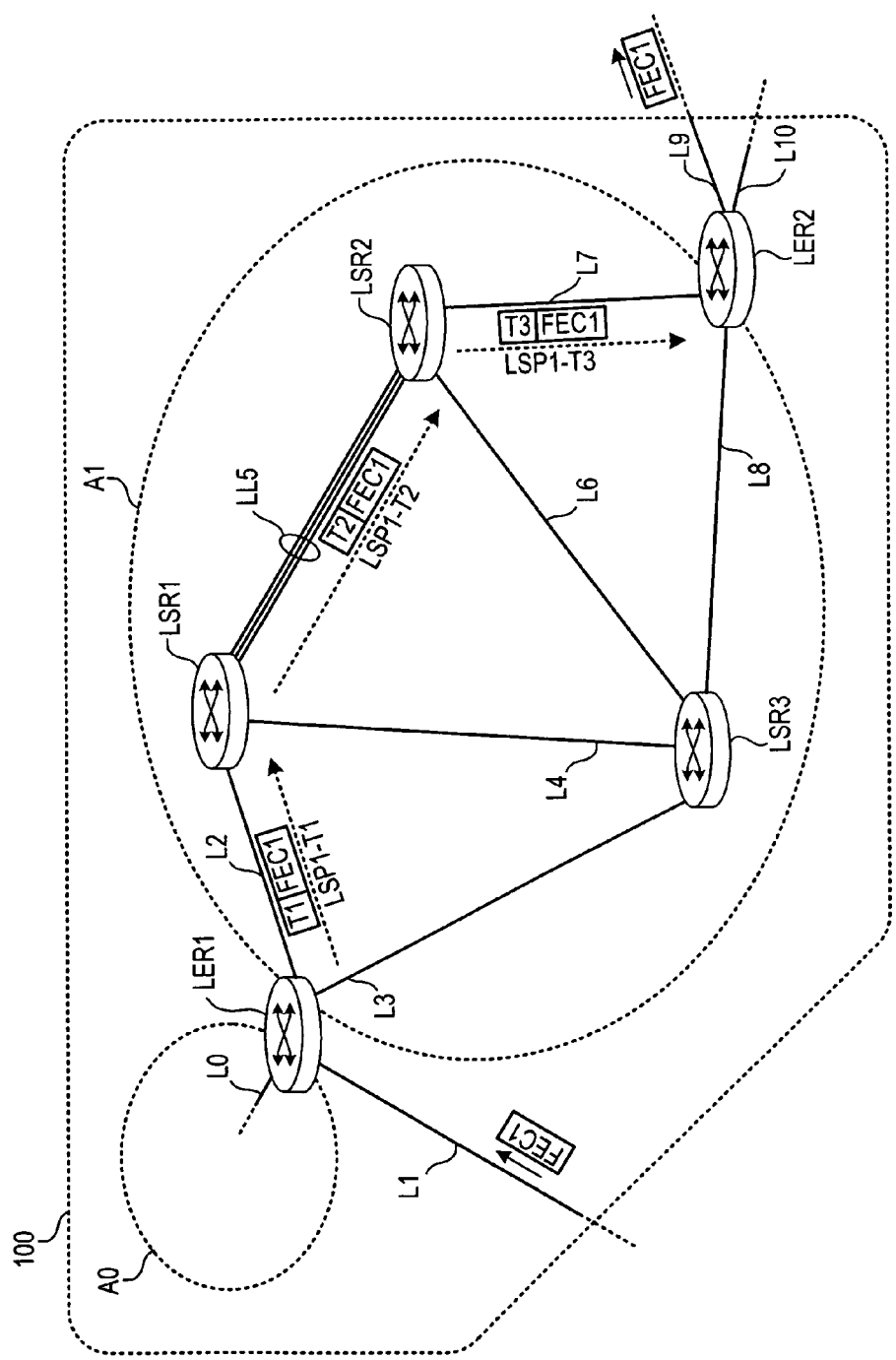

In the FIGS. 1A-1F embodiment, the LSP operates across a logical link LL5 between LSR1 and LSR2. Such a link can be formed between two adjacent switch/routers that have multiple physical channels (separate wires or fibers, separate wavelength channels, etc.) connecting the two. To create a logical link, the two adjacent switch/routers form a link aggregation group (LAG) that the two switch/routers manage between themselves. The routers then advertise the multiple physical channels to other devices in the area (e.g., using OSPF, IS-IS, etc.) as a single interface (e.g., using a MAC address from one of the interfaces). This advertised interface has a bandwidth capability that is roughly the sum of the bandwidths of the component links. The remainder of the bandwidth is spent in a small overhead exchange comprising link aggregation control protocol (LACP) packets that maintain the logical aggregation.

In operation, the transmitting end of a LAG link distributes the outbound packets for the logical link among the physical component links of the LAG using a hash of the packet header fields. The receiving end merges (usually physically, but possibly only logically when the component link receivers supply packets to different packet processors in a distributed system) the received packets from the physical component links for processing and forwarding toward their respective destinations. In order to avoid inadvertently reordering packets belonging a common packet flow, LAG implementations use a hash-based function to distribute packets across the LAG membership. The hash-based function creates a hash key from packet information such as source/destination addresses, and then uses a hash value created from the hash key to select an interface for each packet. This ensures that packets from a common packet flow follow the same physical link across the LAG, and therefore do not become out of order from traversing the LAG on different links.

In prior art traffic-engineered networking, a router operating a LAG creates link state advertisements for reachability and traffic engineering parameters based on the bandwidth capacity of the entire LAG. LERs can then reserve a portion of the aggregate bandwidth on the LAG for their LSP tunnel requirements.

A problem can arise with the reservation of bandwidth on a LAG, as opposed to the reservation of bandwidth on a physical link. Due to the nature of the hash function used to distribute packets across a LAG's member links, scenarios exist where some LAG component links receive more than a "fair share" of the LAG traffic, while other LAG components links remain relatively lightly loaded. In extreme situations, one LAG component link may cause undesirable packet delay or even dropping behavior for an important packet flow that has been hashed to a busy link, even though the LAG as a whole remains below capacity.

In the following examples, a LSR operating a LAG has the capability to advertise—for each of the LAG's component links and not just for the LAG as an entity—TE information (such as maximum bandwidth, reservable bandwidth, average bandwidth, unreserved bandwidth, etc.) in its TE LSAs. A LER desiring to set up a LSP through the LSR can then consult this component link information in its TED, and select an individual link of the LAG for use in the LSP based on the individual link loading, etc. The LER, when requesting an LSP with an explicit route, can then request a reservation of bandwidth on a particular LAG component link that seems appropriate for the LSP traffic requirements. The LSR has the ability to grant the bandwidth reservation for a particular LSP/component link combination. The LSR then removes traffic for that LSP from LAG hashing behavior by creating a routing entry pointing to the specifically requested component link interface, instead of the LAG interface. In essence, this allows the LER to manage the reservable portion of the LAG bandwidth according to its own traffic considerations, instead of relying on the pseudorandom behavior of the LAG hashing packet distribution. The behavior of other traffic traversing the LAG, such as OSPF-routed IP traffic, is not affected and continues to be routed as if the LAG were a single link.

Figure 2:
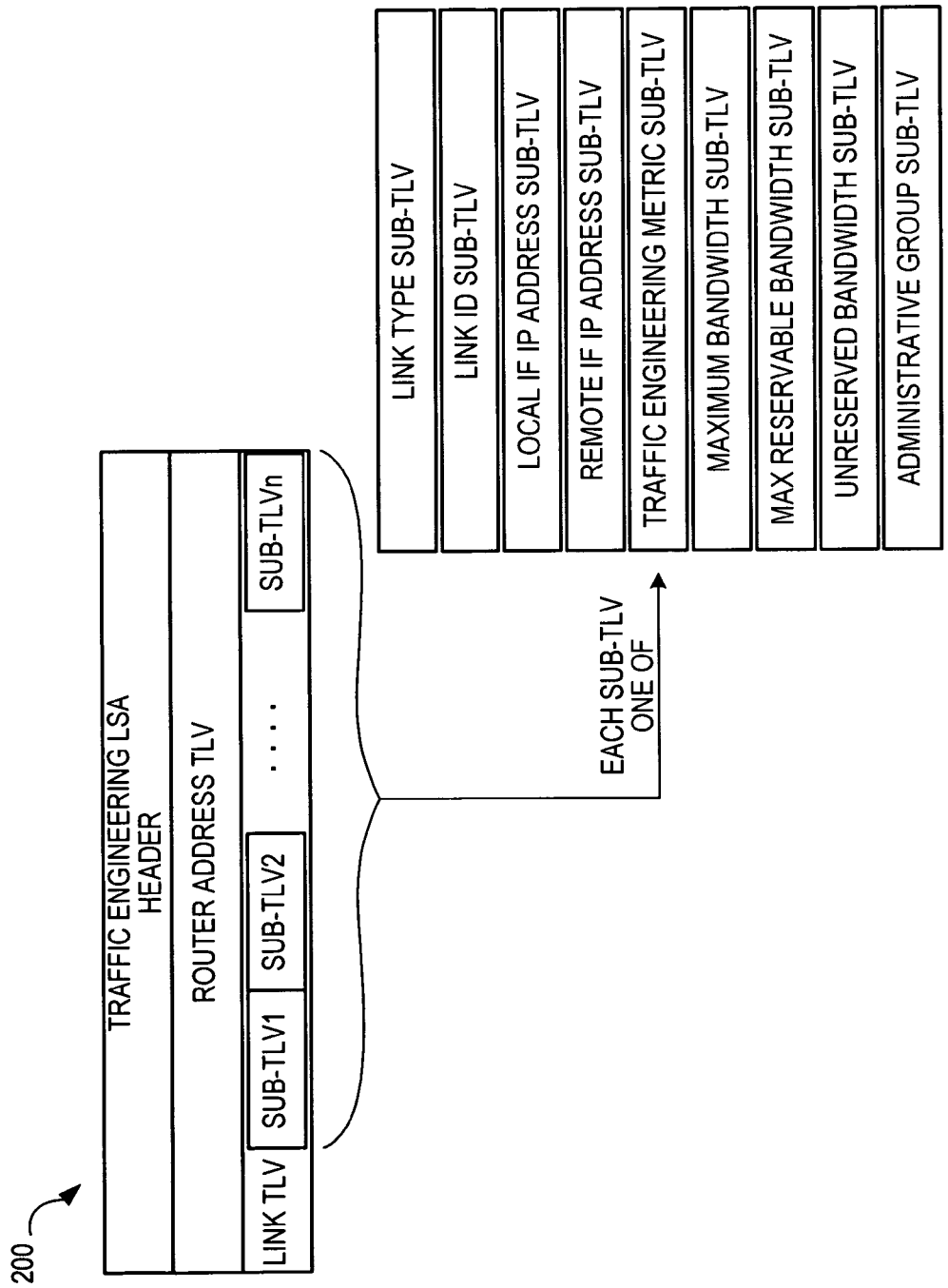
FIG. 2 illustrates a prior art traffic engineering link state advertisement.
Figure 3:
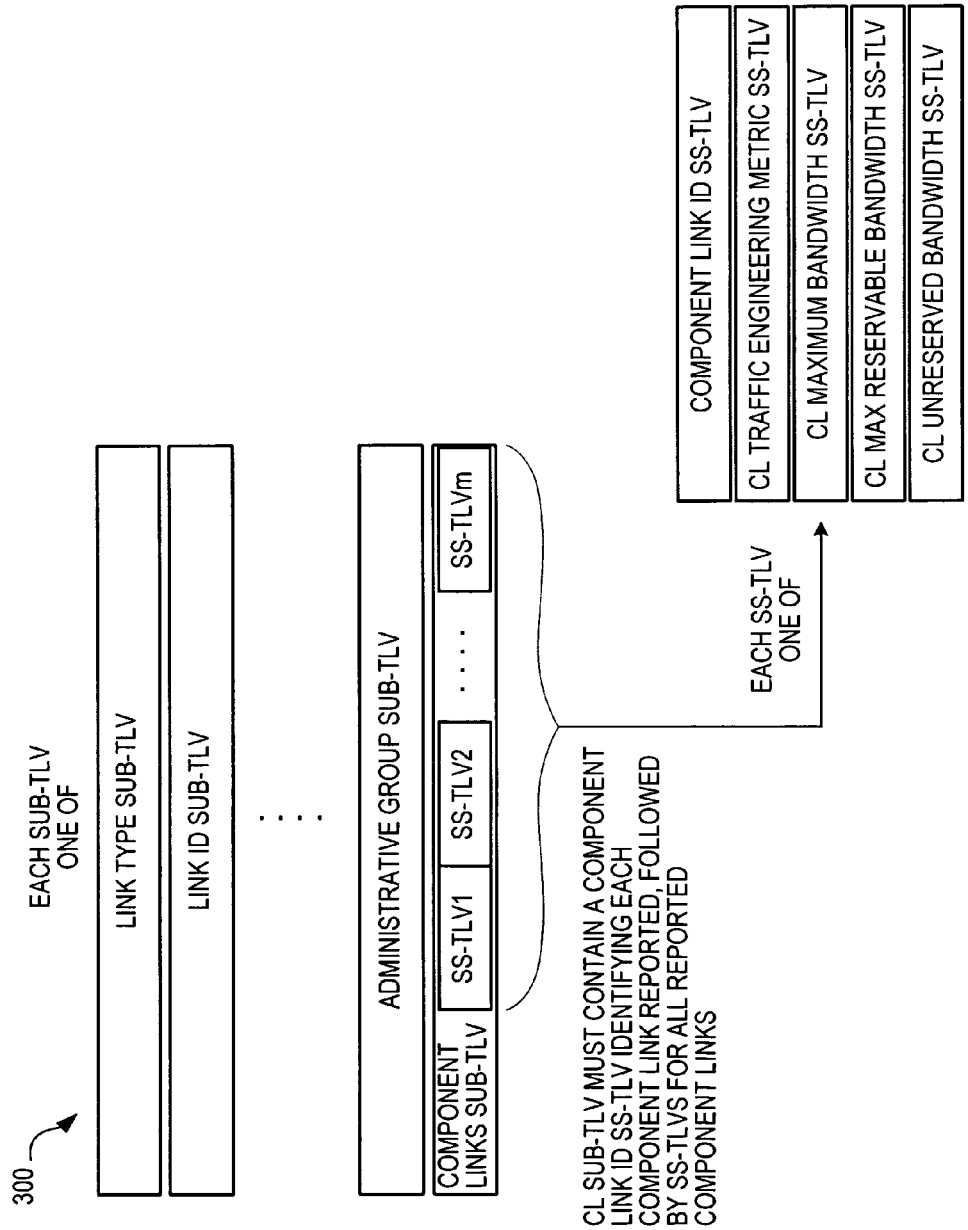
FIG. 3 illustrates a traffic engineering link state advertisement according to an embodiment.

In one embodiment, component link traffic engineering information is distributed in IGP TE LSAs using a new sub-TLV type. FIG. 3 illustrates an exemplary set 300 of sub-TLVs and sub-sub-TLVs (SS-TLVs) for this embodiment. The sub-TLV types in the OSPF TE LSA show in FIG. 2 are augmented in FIG. 3 with a new sub-TLV type, a "component links sub-TLV." The component links sub-TLV allows a router to specify, for TE purposes, information about individual component links that make up an IGP-advertised logical link. A component links sub-TLV is composed of at least two of the SS-TLVs shown in FIG. 3. The first SS-TLV—which is mandatory in this embodiment—is a "component link ID" SS-TLV. The component link SS-TLV describes the IDs of the component links being reported in this LSA, e.g., by using the true MAC address of these links. There is no requirement that a router advertise traffic engineering capability for each component link in a LAG, or that all component links for the LAG be included in each LSA. For instance, a router could be configured to not make available one or more links for individualized TE use by simply not advertising traffic engineering SS-TLVs for the held back links. A router may also advertise two or more of the component links together as a single traffic-engineered link that is neither a single physical link nor the entire LAG. Also, when TE information changes for only some component links, the component link ID SS-TLV need only report TE information for the component links that have changed since the last TE LSA.

In addition to the component link ID SS-TLV, the component links sub-TLV must also contain at least one other SS-TLV. Some examples of possible SS-TLVs are shown in FIG. 3, including a "component link traffic engineering metric" SS-TLV, a "component link maximum bandwidth" SS-TLV, a "component link maximum reservable bandwidth" SS-TLV, and a "component link unreserved bandwidth" SS-TLV. Each of these SS-TLV types reports the same parameter for each of the component links identified in the SS-TLV. For instance, when three component link IDs are reported in a component link ID SS-TLV, a following SS-TLV of type CL maximum bandwidth will report three maximum bandwidths, corresponding in the same order to the three reported component links.

In one embodiment, an LER that receives TE information for a LAG's component links can decide for each LSP that will traverse the LAG whether the LER wishes to utilize the LAG as a single pipe or reserve bandwidth on individual component links of the LAG. Optionally, the LER can also decide whether bandwidth reservations on individual component links are explicit or left up to the LSR controlling the LAG, based on a desired QOS and traffic quality reported in a PATH setup message. The different considerations that go into which of these reservation types works best in a given network environment and for a given traffic type are largely beyond the scope of this disclosure—it is assumed that an LER will run some type of constraint-based routing algorithm on a TED that includes the component link TE information, and as a result possibly select an LSP explicit route that includes a component link. An RSVP-TE path setup message for a given LSP can thus specify the hops in the explicit route, and, for any path segment that traverses a LAG with individually reservable bandwidth on component link LAG members, can specify an explicit component link, or an implicit component link via supplied parameters.

Figure 4:
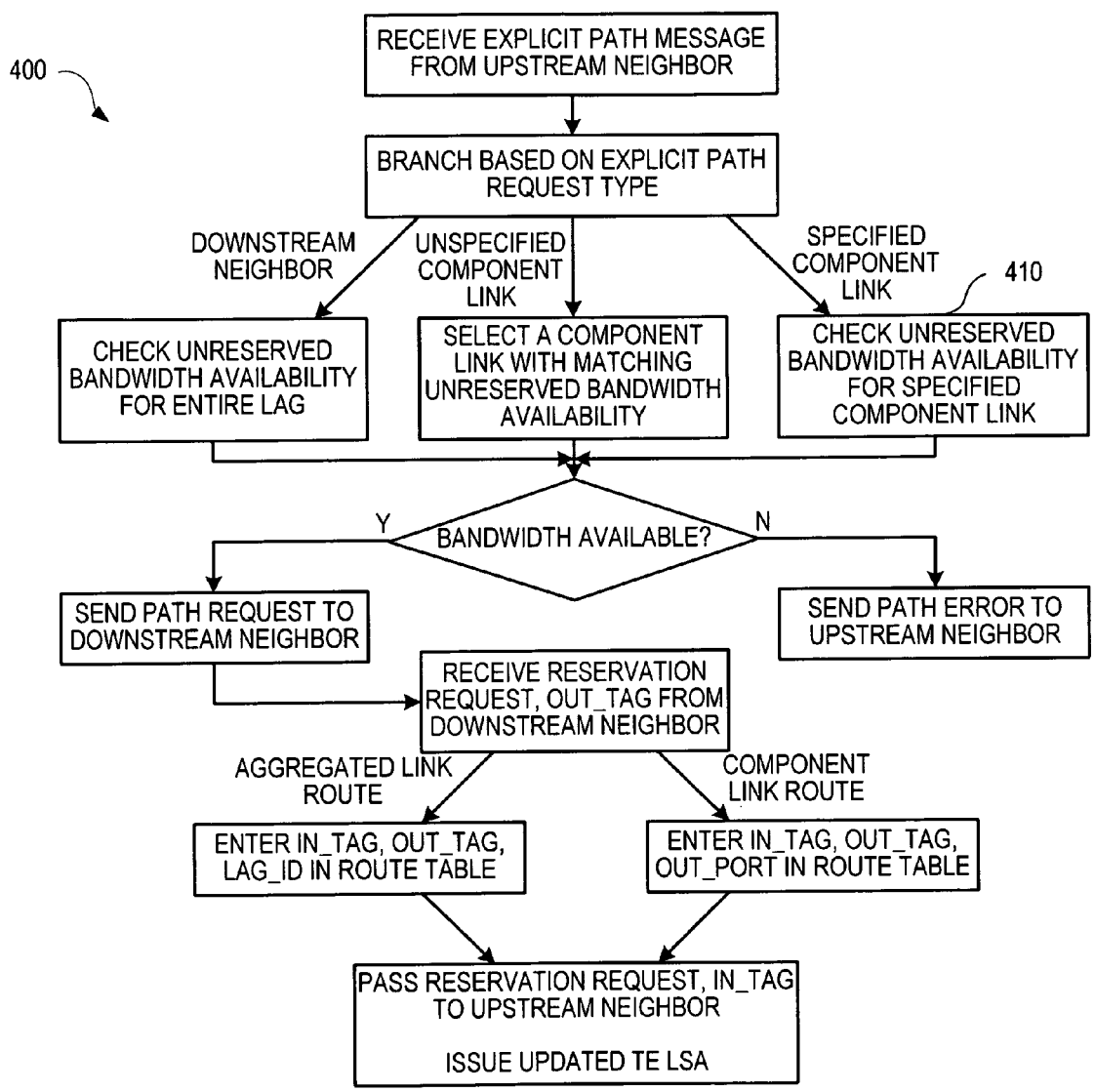
FIGS. 4 and 5 contain flowcharts for operation of a label-switching router embodiment.

FIG. 4 contains a flowchart 400 for an LSP receiving an RSVP-TE path setup message according to an embodiment. When the LSP receives a path setup message containing an explicit route object, it determines the type of path segment requested by the LER. When the next hop segment is a LAG, the type of path segment requested can be a "downstream neighbor" segment, an "unspecified component link" segment, or a "specified component link" segment. A "downstream neighbor" path segment corresponds to a prior art explicit route in that the next hop router is all that is specified. When the next hop path segment is of this type, the LSR determines whether the requested bandwidth exists on the LAG as a whole. An "unspecified component link" path segment is a request for the LSR to select a single LAG component link that can best handle traffic of a given bandwidth and priority, etc. When the next hop path segment is of this type, the LSR determines whether there is a component link that can meet the requested service and bandwidth limitations. A "specified component link" path segment is a request for a bandwidth reservation on an explicit component link of a LAG. Whether this request can be met requires checking the current reservation profile for that explicit link—something that will be explained in further detail in conjunction with FIG. 5.

In each of the three cases, when the requested bandwidth is unavailable, a path error message is generated to the upstream neighbor. Otherwise, the provisional request of bandwidth is noted along with the return path to the upstream neighbor, and the path request is forwarded downstream to the next hop router.

When the path request can be met along the entire explicit route, the LSR will receive a return reservation request from the downstream neighbor, including an "OUT_TAG" that must be used on all outgoing MPLS packets for this LSP. The LSR selects an "IN_TAG" that it requires be used for incoming packets on the LSP, and then sets up the LSP local forwarding in one of two ways. When the path type utilizes bandwidth on the LAG as a whole, e.g. the LSP is an "aggregated link route," the route table is updated with the IN_TAG, the OUT_TAG to be swapped for the IN_TAG, and the LAUD to be used for forwarding traffic on this LSP. When the path type utilizes bandwidth on a component link of the LAG, e.g., the LSP is a "component link route," the route table is updated with the IN_TAG, the OUT_TAG to be swapped for the IN_TAG, and the OUT PORT to be used for forwarding traffic on this LSP. A reservation request RSVP-TE packet is then passed to the upstream neighbor on the path, including the IN_TAG. The reserved bandwidth is noted in the local traffic engineering database, and an updated TE LSA—including an updated component link sub-TLV if necessary—is created and flooded within the network area.

Figure 5:
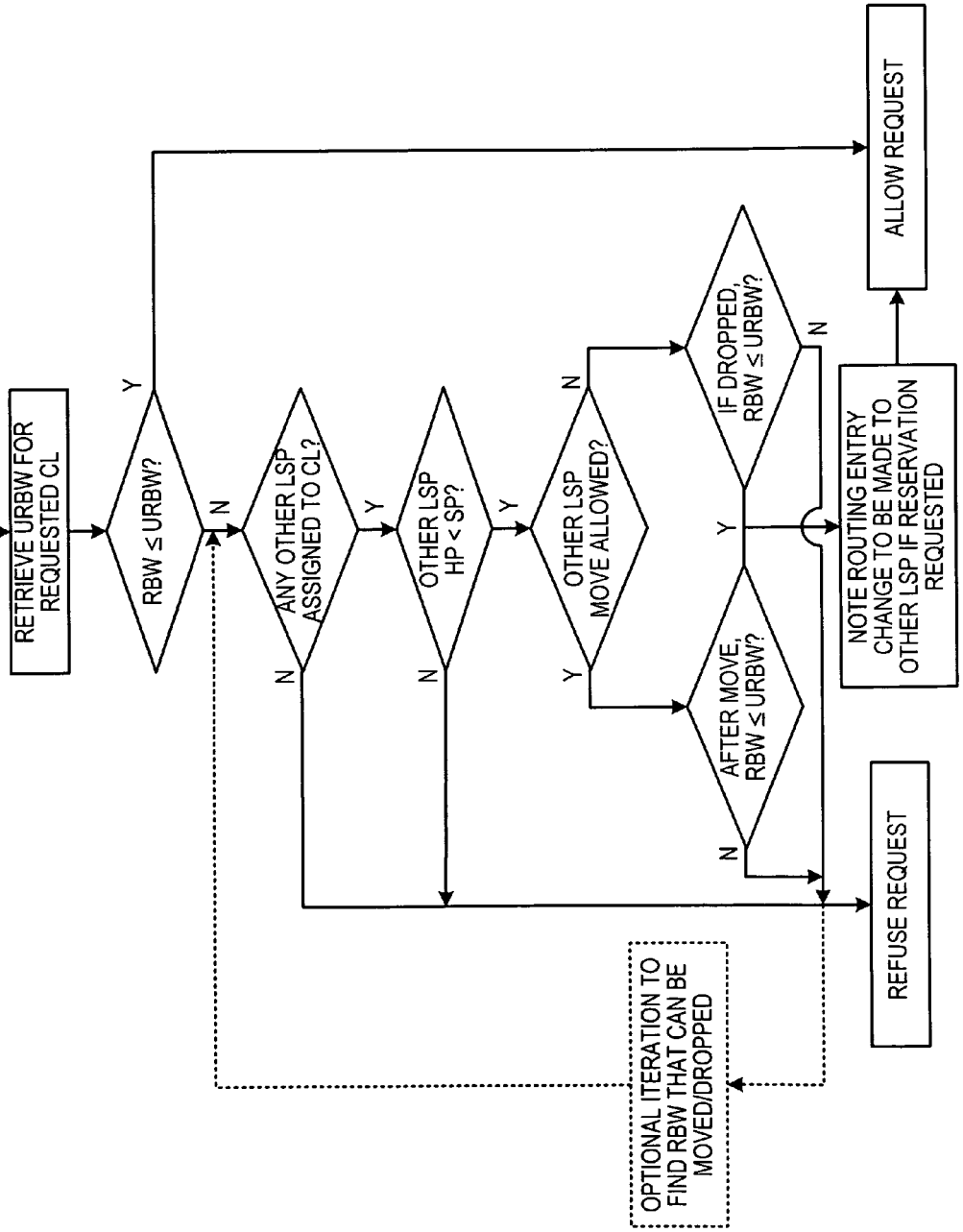

FIG. 4 block 410 illustrates the check for bandwidth availability that is performed by the LSR when the LER explicitly requests that a specific component link be used for an LSP. FIG. 5 contains a detailed flowchart that expands block 410 for one embodiment. In FIG. 5, a path setup message has explicitly requested a bandwidth reservation on a component link CL for traffic having a setup priority SP and a bandwidth requirement RBW. Upon receiving this bandwidth reservation request, the LSR retrieves from its local database its unreserved reservable bandwidth URBW for component link CL. RBW is compared to URBW; if RBW is ≦URBW, the request is allowed. Otherwise, the local database is consulted to see whether any other LSPs have bandwidth assigned on component link CL. If not, the request is refused. If so, the hold priority HP for the other LSP (or the LSP with the lowest hold priority and best match to the requested bandwidth if several other LSPs have bandwidth reserved) is compared to the setup priority SP for the new request. When the setup priority is no higher than the existing hold priority, the new request is refused. Otherwise, the new request is allowed to preempt an existing LSP. In other words, the new request can cause one or more existing LSPs to be bumped from the component link.

In one embodiment, "bumping" can mean either dropping the lower priority LSP completely, or moving the lower priority LSP when this is allowed. The LER can determine at LSP setup time whether it will allow the LSP to be moved should a higher priority LSP need bandwidth on the specified component link. When such is allowed, the LSR may consider other locations for a bumped LSP, including other component links or the LAG as a whole. It is possible that such movement could cause a ripple effect, where the bumped LSP if necessary bumps an even lower priority LSP from its component link assignment.

In FIG. 5, the LSR determines whether the lower priority LSP may be moved or must be dropped. In either case, the LSR determines whether as a result of the move or drop, RBW is now less than or equal to URBW. If not, the method can iterate to find additional lower-priority LSPs that can be bumped to make room for the new request. Assuming that after one or more iterations RBW≦URBW, the LSR notes the routing entries that will have to be modified should this reservation be requested, and allows the request to proceed downstream as previously described.

Although a separate flowchart has not been presented for an unspecified component link example, the logic is similar to FIG. 5. The primary difference is that the LSR first finds a best candidate component link upon which to perform the FIG. 5 analysis. When the FIG. 5 analysis cannot allow the request for the best candidate component link, the LSR may either refuse the request or examine other component links for a potential fit.

When the LER issues an explicit route request for a specified or unspecified component link, it can optionally instruct the LSR to drop to a lower bandwidth reservation preference should the bandwidth first preference be unavailable. When a specified component link is requested, either a second choice explicit component link, an unspecified component link, or general LAG treatment can be specified as a second choice for reservation. A third possibility can be identified as well. When an unspecified component link is requested, general LAG treatment can be specified as a second choice for reservation.

Figure 6A:
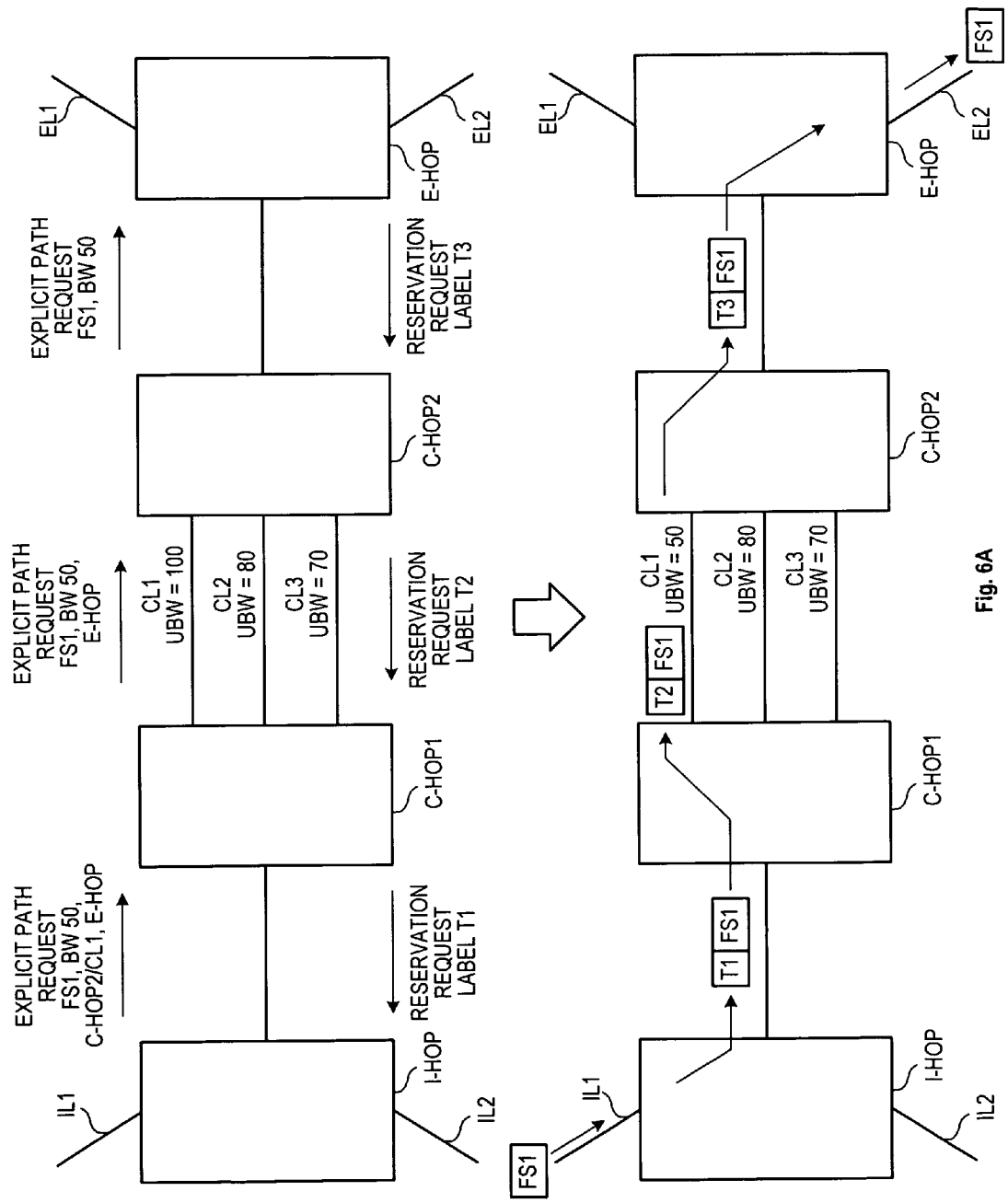
FIGS. 6A-6C illustrate an operation example of an embodiment.
Figure 6B:
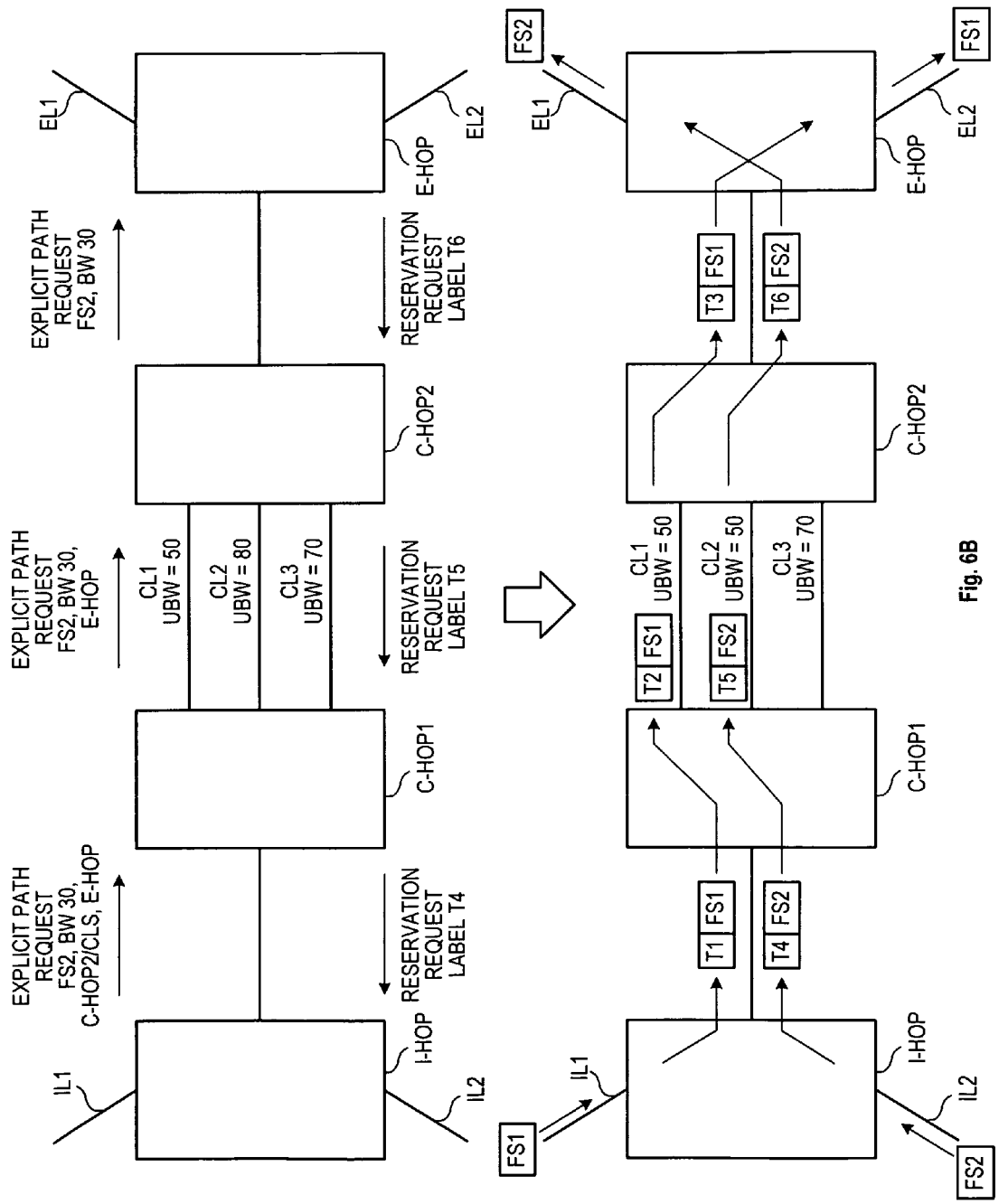
Figure 6C:
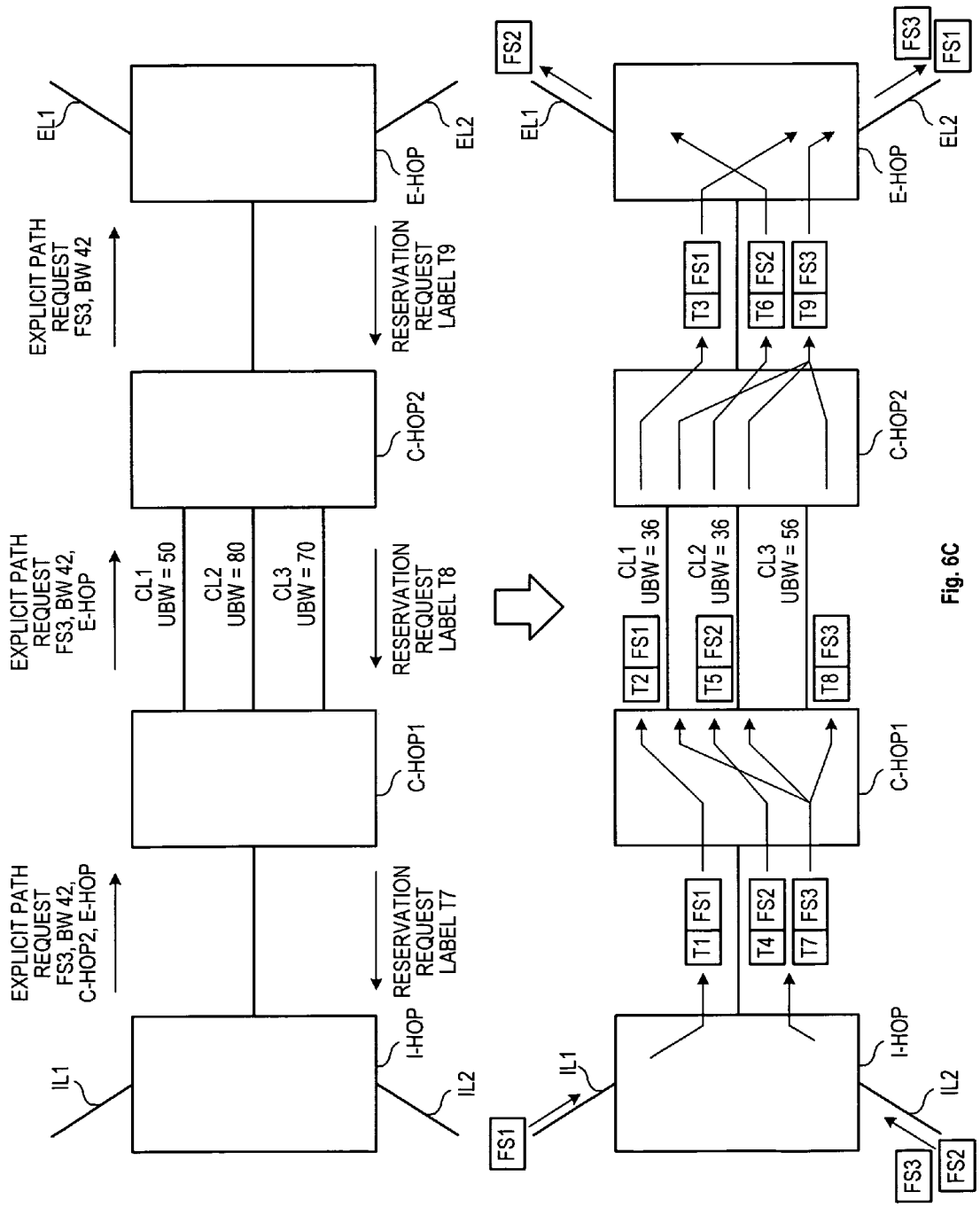

FIGS. 6A-6C illustrate an example wherein three LSPs are setup between an LER I-HOP and an LER E-HOP, with two intermediate LSRs C-HOP1 and C-HOP2. An actual LSP could be longer, or could have more LAG hops, and the network area will almost certainly contain more nodes, but a simplified view of the network area has been selected so that operation of an embodiment can be presented with clarity.

In FIGS. 6A-6C, C-HOP1 and C-HOP2 are connected by three point-to-point component links CL1, CL2, and CL3 that are managed as a LAG and reported to IGP as a single logical link. C-HOP1 created component link TE sub-TLVs as described above, however, and thus I-HOP is aware of the component link unreserved bandwidths. At the beginning of the example (FIG. 6A, top view), C-HOP1 has reported unreserved bandwidths UBW of 100, 80, and 70, respectively, on CL1, CL2, and CL3. I-HOP determines that it would like to set up an LSP for a forwarding equivalence class specified by a filterspec FS1, with a bandwidth requirement BW=50. I-HOP formulates an explicit route request specifying FS1, BW 50, and an explicit route C-HOP2/CL1, E-HOP, and forwards this request over RSVP-TE to C-HOP1. C-HOP1 determines that sufficient bandwidth exists on CL1 for the request, and thus forwards an RSVP-TE explicit route request FS1, BW 50, explicit route E-HOP to C-HOP2 (the path request itself need not traverse CL1, but could be placed on any LAG member). Assuming C-HOP2 can grant the bandwidth requested, it forwards an RSVP-TE explicit route request FS1, BW 50 to E-HOP. E-HOP responds by returning to C-HOP2 an RSVP-TE reservation request with a label T3. C-HOP2 reserves the bandwidth on its link to E-HOP, and returns to C-HOP1 an RSVP-TE reservation request with a label T2. C-HOP1 reserves the bandwidth on CL1, reducing CL1's unreserved bandwidth from 100 to 50. C-HOP1 returns to I-HOP an RSVP-TE reservation request with a label T1. The LSP for filterspec FS1 is now ready for use.

As shown in the bottom half of FIG. 6A, when a packet meeting filterspec FS1 subsequently arrives on an ingress interface IL1 on I-HOP, I-HOP labels the packet with an MPLS header specifying T1, and forwards the packet to C-HOP1. C-HOP1, upon receiving the MPLS packet, looks up T1 in its route table and determines that T1 should be swapped for T2 and the packet forwarded out the CL1 interface to C-HOP2. C-HOP2, upon receiving the MPLS packet, looks up T2 in its route table and determines that T3 should be swapped for T2 and the packet forwarded to E-HOP. E-HOP removes the MPLS header and forwards FS1 out an appropriate interface (EL2 in this example).

FIG. 6B illustrates the setup and use of a second LSP that traverses the same four nodes, this time for a filterspec FS2, a bandwidth BW=30, and an explicit route C-HOP2/CLS, E-HOP. The designation "C-HOP2/CLS" represents a "component link specification" to C-HOP2. Thus C-HOP1 may set up the path using any of CL1, CL2, and CL3 that can best meet bandwidth BW and whatever other constraints are specified in CLS (setup priority, hold priority, latency, average bandwidth, etc.). At this time, C-HOP1 selects CL2, with UBW of 80, to fulfill this request. This results in an LSP that uses the labels T4-T5-T6, and reports UBWs on CL1, CL2, and CL3 of 50, 50, and 70, respectively.

As shown in the bottom half of FIG. 6B, when a packet meeting filterspec FS2 arrives on an ingress interface IL2 on I-HOP, I-HOP labels the packet with an MPLS header specifying T4, and forwards the packet to C-HOP1. C-HOP1, upon receiving the MPLS packet, looks up T4 in its route table and determines that T5 should be swapped for T4 and the packet forwarded out the CL2 interface to C-HOP2. C-HOP2, upon receiving the MPLS packet, looks up T5 in its route table and determines that T6 should be swapped for T5 and the packet forwarded to E-HOP. E-HOP removes the MPLS header and forwards FS2 out an appropriate interface (ELI in this example).

FIG. 6C illustrates the setup and use of a third LSP that traverses the same four nodes, this time for a filterspec FS3, a bandwidth BW=42, and an explicit route C-HOP2, E-HOP. The designation "C-HOP2" indicates that C-HOP1 is to use the LAG group CL1, CL2, CL3 as a whole to form the downstream segment of the LSP. This results in an LSP that uses the labels T7-T8-T9, and reports UBWs on CL1, CL2, and CL3 of 36, 36, and 56, respectively. Although this is an equal apportionment of the reservation bandwidth, the FS3 traffic may not balance equally among the three links. Thus I-HOP 1 may select this reservation method for low-priority traffic that can be dropped/delayed if necessary.

As shown in the bottom half of FIG. 6C, when a packet meeting filterspec FS3 arrives on an ingress interface IL2 on I-HOP, I-HOP labels the packet with an MPLS header specifying T7, and forwards the packet to C-HOP1. C-HOP1, upon receiving the MPLS packet, looks up T7 in its route table and determines that T8 should be swapped for T7. C-HOP1 hashes selected header information from FS3 to select one of CL1, CL2, or CL3 for forwarding the packet, in this case selecting CL3. Other packets in the filterspec FS3, unless all have identical addressing information, will in some cases be hashed to CL1 and CL2 as well. CHOP-2, upon receiving the MPLS packet, looks up T8 in its route table and determines that T9 should be swapped for T8 and the packet forwarded to E-HOP. E-HOP removes the MPLS header and forwards FS3 out an appropriate interface (EL2 in this example).

FIG. 7 illustrates, in block diagram form, a block diagram for ingress operations performed at C-HOP2 in one embodiment and for the FIG. 6C scenario. Blocks illustrated in FIG. 7 include a lookup engine LE, a hash calculate function HC, a modulus function MOD, a LAG group table LGT, a routing table RT, and a packet processor PP.

When a packet P1 arrives, its headers are inspected by lookup engine LE. Lookup engine LE forms several keys from the header contents, including a hash key and a CAM (Content-Addressable Memory) key. The hash key will typically use flow-stable information such as source and destination addresses and ports, Ethernet and/or IP packet type, etc., such that packets in a common flow will produce the same hash key. The CAM key formats header information in an ordering expected for routing lookups in a CAM containing RT. Such a format is highly implementation-specific, but is shown in FIG. 7 to include at least an Ethertype and either source and destination addresses (SA/DA) or an MPLS label.

Routing table RT includes CAM entries corresponding to various possible CAM keys. A typical CAM is a ternary CAM, e.g., a lookup of any particular bit in the CAM key can either be required to match a 0, match a 1, or match either (a "don't care" condition, noted by an "X"). Routing table RT includes information linked to the CAM entries, either stored explicitly with the CAM entry or stored elsewhere in a memory location derivable from the address returned by a CAM hit. In FIG. 7, this linked information includes a MI (Multiple Interface) flag, a field specifying either an outbound interface or a MI group ID, and packet edit instructions. The MI flag is set to 0 for an entry when the entry specifies an outbound interface, and is set to 1 when an entry specifies a MIF group ID.

Four entries are shown in routing table RT. The first entry is for IP packets with destination addresses that match the address 192.168.X.X, where X matches anything. The routing table indicates that packets matching this entry are to be edited to update their time to live (TTL) and forwarded out a port P2 on a line card LC4.

The other three entries shown in routing table RT are for the three MPLS flowspecs FS1, FS2, and FS3 shown in FIG. 6C. Each entry matches a CAM key for an MPLS packet, with MPLS labels T1, T4, and T7, respectively, for the three entries. When the MPLS label is T1, the routing table indicates that packets matching this entry are to be edited to update their TTL, and that T2 is to be swapped for T1 in the MPLS header. The packets are then forwarded out the outbound interface CL1 on a linecard LC3. When the MPLS label is T4, the routing table indicates that packets matching this entry are to be edited to update their TTL, and that T5 is to be swapped for T4 in the MPLS header. The packets are then forwarded out the outbound interface CL2 on linecard LC3. When the MPLS label is T7, the routing table indicates that packets matching this entry are to be edited to update their TTL, and that T8 is to be swapped for T7 in the MPLS header. The packets are then forwarded on the LAG group LL5.

In all cases, the edit instructions from the routing table entry are passed to the packet processor PP to perform the necessary packet modifications. In the case of an MPLS packet with label T7, routing table RT indicates that an additional step is required to determine the outbound interface. A MI flag value of 1 causes the group ID to be used to address an entry in the LAG group table LGT. LGT entries indicate a number of interfaces in the group (#IF) and a list of the interfaces. The single entry shown is for LAG LL5, and specifies three interfaces CL1, CL2, and CL3 as members. In this example, the #IF of 3 is supplied to the MOD function, which performs a modulus operation on the hash value produced by hash calculate HC, and thus returns either 0, 1, or 2. The result of the modulus operation is provided as a selector into the IF list, in this case selecting the third entry for the outbound interface.

In each case, a small internal use header specifying the outbound interface is prepended to the packet as modified by the packet processor, forming a modified packet P1'. The internal use header will be removed before the packet leaves the specified outbound interface.

The preceding example illustrates one method for using hardware to forward traffic-engineered MPLS packets over either a LAG or a component link of the LAG. There is no requirement that the component link be a single physical link. A traffic-engineered component link could also be a subset of the LAG component links, i.e., LGT could contain a second entry specifying two interfaces (CL1 and CL2, for example), with some routing table entries pointing to this LGT entry.

Although LACP continues to manage CL1, CL2, and CL3 as a single LAG, nothing prevents MPLE-TE in this example from managing a subset of the LAG membership from a traffic engineering standpoint and assigning some traffic to the subset. Some LAG component links can be dedicated to serve individual LSPs, with no traffic hashed to those links. Likewise, some LAG component links can be dedicated only to general LAG treatment, by not advertising component link bandwidth for those links. Also, when a component link carries both individual LSPs and hashed traffic, the hashed traffic can be rate-limited to guarantee the bandwidth reserved for the individual LSPs assigned to that link.

In a given embodiment, a management processor (or group of cooperating processors) will be responsible for interpreting and creating IGP LSAs and RSVP-TE messages, managing reservations for links and component links, and updating the routing tables as necessary. Such functions will generally be expressed as machine-executable software stored on a computer-readable medium, with the medium being local and/or remote to the processor(s) executing the software.

Although several embodiments and alternative implementations have been described, many other modifications and implementation techniques will be apparent to those skilled in the art upon reading this disclosure. For instance, other formats for conveying component link TE information could be used, including some re-use and/or extension of the MPLS "unnumbered links" capability for conveying this information in sub-TLVs. Although all LSRs are shown performing label swaps in the examples, an LSP could use MPLS "penultimate hop popping" in conjunction with an embodiment wherein the LAG link connects the LSR to the egress LSR for the LSP tunnel. Other protocol examples are merely exemplary—at least one other similar protocol exists for each one utilized in the examples, with these similar protocols being similarly modifiable in a given embodiment.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a first packet network device, the method comprising:
   advertising, via link state advertisements to a third packet network device, a route to a second packet network device, the route comprising a link aggregation supported by the first packet network device;
   advertising, via traffic engineering advertisements to the third packet network device, individual bandwidth availability for a group of component links that are members of the link aggregation, the group comprising at least one component link
   receiving a first request including a first label to reserve bandwidth on a first member link, of the group of component links, for traffic directed toward the first packet network device from the third packet network device along a first label-switched path;
   reserving the bandwidth on the first member link;
   acknowledging the reservation by directing a second request toward the third packet network device, the second request indicating a second label to be used on the first label-switched path; and
   creating a first routing table entry instructing the first packet network device to accept packets labeled with the second label, swap the second label for the first label, and direct the label-swapped packets toward the second packet network device on the first member link.

2. The method of claim 1, further comprising advertising, via traffic engineering advertisements to the third network device, bandwidth availability for the link aggregation as a whole.

3. The method of claim 2, further comprising creating a single link state advertisement identifying both traffic engineering information for the link aggregation as a whole and traffic engineering information for at least one component link of the group of component links.

4. The method of claim 3, wherein a traffic engineering advertisement identifying the link aggregation comprises a type-length-value field with a type corresponding to component link traffic engineering information, and a value containing at least one sub-type-length-value field describing traffic engineering information for the at least one component link.

5. The method of claim 1, further comprising advertising, via a traffic engineering advertisement to the third packet network device, a change in unreserved bandwidth on the first member link.

6. The method of claim 1, wherein the identity of the first member link is explicitly specified by the third packet network device.

7. The method of claim 6, further comprising the third packet network device indicating to the first packet network device that if the requested bandwidth is not available on the explicitly specified member link, the first packet network device may satisfy the request by selecting as the first member link another link, having the requested bandwidth available, from the group of component links.

8. The method of claim 7, further comprising the third packet network device indicating to the first packet network device that if the requested bandwidth is not available on any one link from the group of component links, but is available on the link aggregation or a smaller aggregation of the link aggregation component links, the first packet network device may satisfy the request by selecting as the first member link as the link aggregation or smaller aggregation.

9. The method of claim 7, further comprising the first network device subsequently upgrading the label-swapped path to the explicitly specified member link when the requested bandwidth becomes available on the explicitly specified member link.

10. The method of claim 6, wherein a setup priority for the first label-switched path is communicated to the first packet network device, the first packet network device creating the requested bandwidth on the explicitly specified member link by identifying at least one other label-switched path with bandwidth reserved on the explicitly specified member link and a hold priority lower than the setup priority of the first label-switched path, and allocating bandwidth previously reserved by the at least one other label-switched path on the explicitly specified member link to the first label-switched path.

11. The method of claim 10, further comprising dropping the second label-switched path.

12. The method of claim 10, further comprising moving the second label-switched path to another member link of the group of component links, the another member link having available the bandwidth reserved by the second label-switched path.

13. The method of claim 10, further comprising moving the second label-switched path to the link aggregation or a smaller aggregation of the link aggregation component links, wherein the link aggregation or smaller aggregation has available the bandwidth reserved by the second label-switched path.

14. The method of claim 1, wherein the third packet network device specifies at least one traffic characteristic for the label-switched path, and instructs the first packet network device to select the identity of the first member link as a link meeting the at least one traffic characteristic.

15. The method of claim 1, wherein the first and third packet network devices are not adjacent on a network, wherein the first network device supplies the link state advertisements and traffic engineering advertisements to a fourth packet network device, and relies on the fourth packet network device to flood the link state advertisements and traffic engineering advertisements to the third packet network device.

16. The method of claim 1, wherein the at least one component link comprises a logical grouping of a proper subset of the group of component links.

* * * * *